Figure 2:
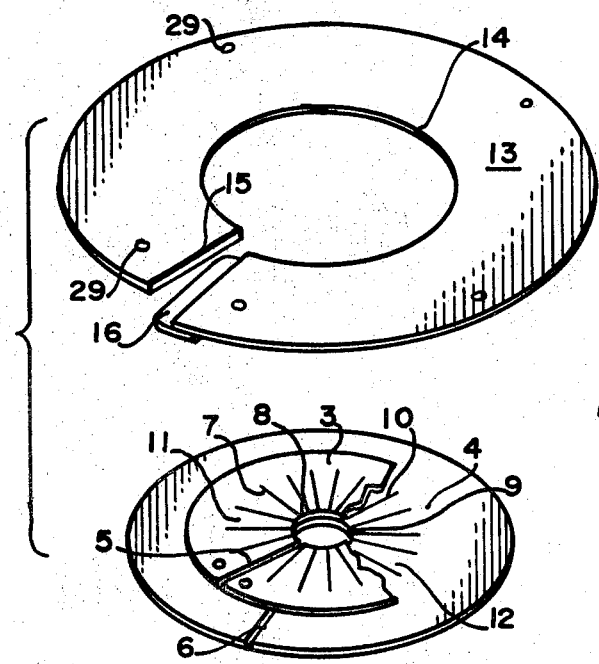

United States Patent

[11] 3,571,972

[72] Inventor William J. Carter, Jr
 4700 LaVista Road, Tucker, Ga. 30084
[21] Appl. No. 803,146
[22] Filed Feb. 28, 1969
[45] Patented Mar. 23, 1971

[54] PROTECTIVE GROUND COLLAR
 7 Claims, 5 Drawing Figs.
[52] U.S. Cl.................................................. 47/25,
 47/32
[51] Int. Cl...................................................... A01g 17/00
[50] Field of Search............................................. 47/23—28,
 30, 32—3; 119/1

[56] References Cited
 UNITED STATES PATENTS
 104,418 6/1870 Brunson....................... 47/25X
 1,931,602 10/1933 Colman......................... 47/25
 2,978,837 4/1961 Daniels........................ 47/25
 2,999,479 9/1961 Carder.......................... 47/23X
 3,305,969 2/1967 Mattson....................... 47/25

FOREIGN PATENTS
 783,798 7/1935 France
 462,525 10/1968 Switzerland

Primary Examiner—Robert E. Bagwill
Attorney—Walter M. Rodgers

ABSTRACT: For enveloping upright elements such as trees, posts and the like at ground level to inhibit the growth of vegetation, a collar is formed of flexible water resistant sheet material and a main opening is formed therein from which a main slit extends to the outer edge of the sheet of material, the main slit being for the purpose of facilitating envelopment of a tree trunk and the like. A plurality of radial inner slits are formed in the sheet and extend outwardly from the central opening to define a plurality of flexible fingers which are disposed against the tree trunk or post to inhibit plant growth. Preferably the sheet is of laminated construction and the inner slits are formed in such manner that the fingers formed in the two laminated sheets are disposed in staggered relationship and the main slits in the two sheets are disposed out of coincidence with each other.

PATENTED MAR 23 1971

3,571,972

INVENTOR
WILLIAM J. CARTER, JR.
BY Walter M. Rodgers
ATTORNEY

PROTECTIVE GROUND COLLAR

Undesired growth of grass, weeds and the like in the region immediately adjacent the trunks of growing trees, fence posts and other upright elements is both unsightly and cannot be controlled with facility due to the fact that ordinary mowers and other cutting devices cannot efficiently cut such undesired growth.

According to this invention, a ground collar is provided for disposition about the trunks of growing trees, bushes, fence posts and other upright elements and effectively inhibits the growth of undesired vegetation in the region immediately adjacent trees, fence posts and the like. According to a feature of the invention the ground collar is specially constructed so as effectively to preclude the growth of undesired vegetation in the region immediately adjacent the upright element. This result is accomplished by providing internal slits extending from an opening formed in a flexible sheet and by constructing the opening in such manner that it is slightly smaller and of generally similar configuration to the upright element.

Figure 3:
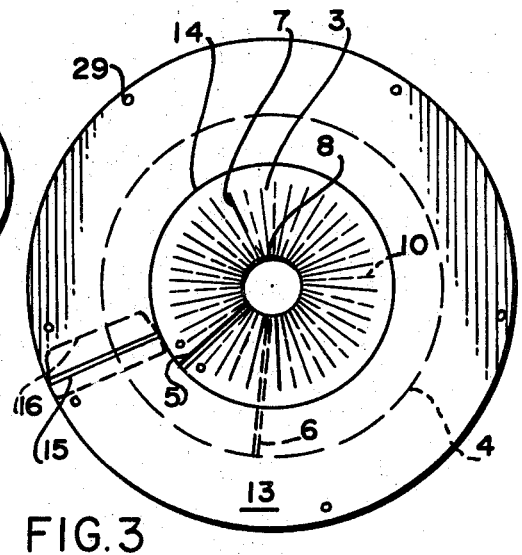
Figure 1:
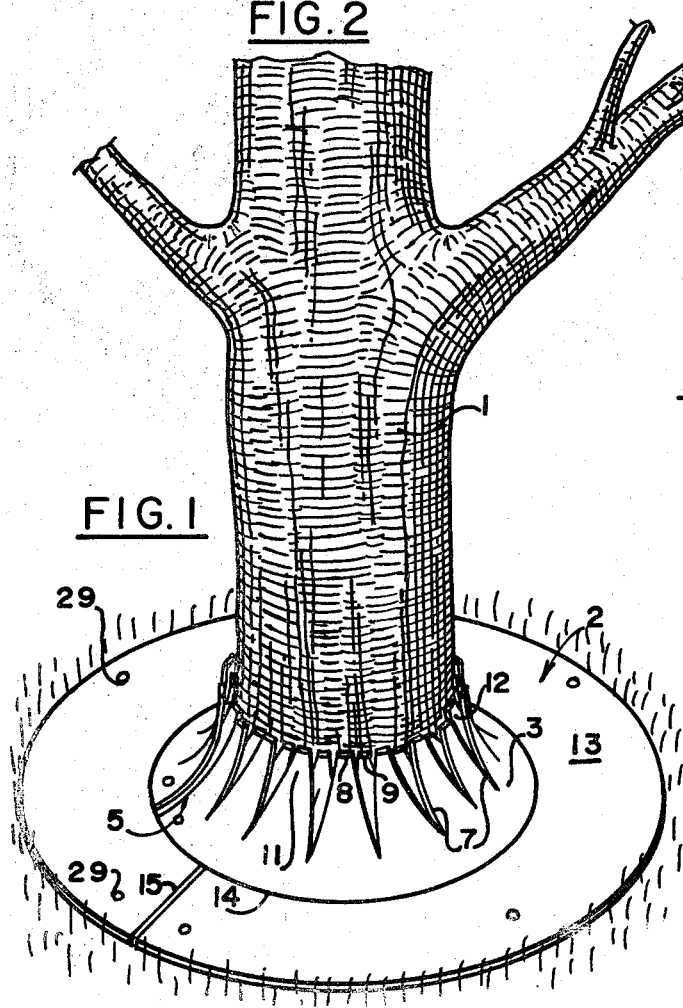
Figure 4:
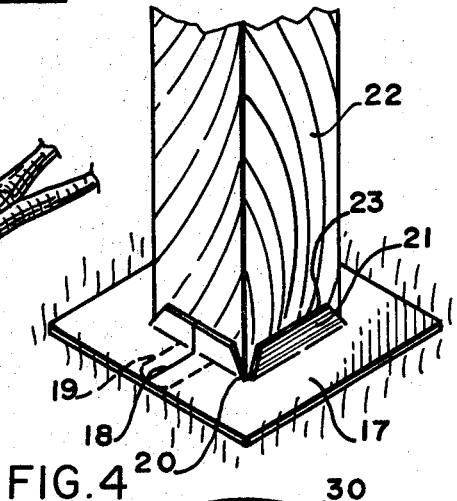
Figure 5:
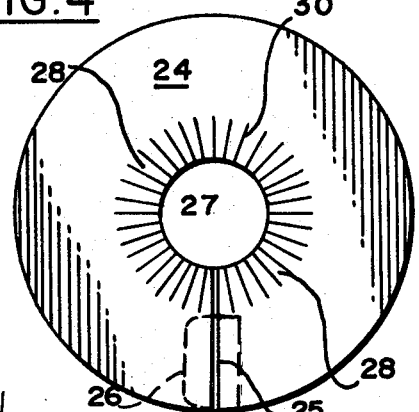

For a better understanding of the invention reference may be had to the following detailed description taken in conjunction with the accompanying drawing in which FIG. 1 is a perspective view of a tree about which the protective collar constructed according to this invention is disposed at ground level; FIG. 2 is a perspective view which is partially exploded and which shows the elements from which the collar is formed; FIG. 3 is a plan view of the collar depicted in FIGS. 1 and 2; FIG. 4 is a perspective view of a special modification of the invention; and in which FIG. 5 is a plan view of still another version of the invention which is specially adapted for use in conjunction with inanimate objects.

In the drawing the numeral 1 is used to designate the trunk of a growing plant such as a tree or bush and the numeral 2 is used to designate generally a ground collar constructed according to this invention. Ground collar 2 comprises a laminated construction as best shown in FIG. 2 and includes a first sheet 3 shown partially broken away and made of flexible water resistant material to which is affixed a second sheet 4 of the same or similar material. A main slit 5 is formed in sheet 3 and a main slit 6 is formed in sheet 4. As is apparent from FIGS. 1, 2 and 3, main slits 5 and 6 are disposed in staggered relationship relative to each other so that these slits are out of coincidence. Formed in sheet 3 is a plurality of inner slits 7 which communicate at their inner ends with a main opening 8 formed in sheet 3. An opening 9 is formed in sheet 4 and coincides with the opening 8 in sheet 3. A plurality of inner slits 10 are formed in sheet 4 and extend radially outward from main opening 9 formed in sheet 4.

As is apparent from FIG. 2, sheets 3 and 4 constitute a unitary collar which is arranged for disposition about the trunk of a growing tree for example as shown in FIG. 1. Furthermore, from FIG. 1 it is apparent that the flexible fingers 11 which are defined by radial inner slits 7 are disposed in staggered relationship to the flexible fingers 12 defined by inner radial slit 10 so that an effective and snug enveloping action is achieved according to a feature of the invention. From FIG. 1 it is apparent that undesired vegetation is precluded from growing in the region immediately adjacent plant 1 due to the staggered relationship of fingers 11 and 12. Furthermore the staggered out of coincidence relationship between main slits 5 and 6 of sheets 3 and 4 precludes the growth of vegetation through the main slits.

For the purpose of enlarging the area about tree 1 about which the growth of undesired vegetation is prohibited, a grommetlike third sheet 13 is provided and an opening 14 is formed therein. Opening 14 is of approximately the same configuration and diameter as is the configuration and diameter of sheet 3 so that the inner portion of grommetlike sheet 13 overlies the part of sheet 4 which is larger than and disposed about the outer periphery of sheet 3. A main slit 15 is formed in sheet 13 and an overlying flap 16 precludes the growth of vegetation through main slit 15.

While it generally is preferable to construct the device as shown in FIGS. 1—3 from a plurality of sheets, it is obvious that a single unitary sheet could be used with the two series of fingers formed integrally with the single sheet and in staggered relation. The term "sheet" may denote a unitary sheet or a pair of separate staggered sheets.

Of course for certain applications of the invention it may be desirable to eliminate the third sheet 13 altogether and enlarge sheet 4 to the size of sheet 3 since it is obvious that for certain applications of the invention, for example, to small plants and bushes, the arrangement shown in the lower portion of FIG. 2 comprising sheets 3 and 4 is adequate when sheets 3 and 4 are of the same size.

Where a square or rectangular post is to be enveloped by a ground collar, the version of the invention depicted in FIG. 4 may be employed. In that figure, the flexible sheet 17 is provided with a main slit 18 and a cover flap therefor shown in dotted lines and indicated by the numeral 19 together with inner slits designated by the numeral 20 which define flexible inner fingerlike elements 21 which lie against the post 22. Of course the opening defined by the inner edges such as 23 of the fingers 21 is smaller than but of the same general configuration as the exterior of post 22.

In FIG. 5 still another modification of the invention is shown in which a single flexible sheet 24 is employed and in which main slit 25 is formed. A cover flap 26 overlies main slit 25 and opening 27 is formed centrally of sheet 24. Inner radial slits 30 define therebetween the fingers 28 which envelop the outer periphery of a device such as a tree, post or the like. In the case of the arrangement of FIG. 5, the inner periphery of the opening 27 is of smaller size and generally of the same configuration as the element with which it is to be used such as a growing tree, a post and the like.

For insuring that the collar will snugly envelope the upright element of FIGS. 4 and 5 it is desirable to secure the fingers to the upright element by a suitable water resistant friction element such as friction tape or the like.

For holding the ground collar in snug engagement with the ground, a plurality of pins such as are designated at 29 in FIG. 1 may be employed. Of course these pins are simply driven through the ground collar and into the ground and serve to hold the ground collar securely in place.

With the ground collar installed as shown for example in FIG. 1, undesired growth of vegetation in the region immediately adjacent the trunk of the tree 1 is prevented. Thus it is possible to mow around the trunk of the tree with conventional mowing equipment with ease since the blades of the cutting equipment will clear the collar when traveling above the collar. Furthermore, the ground collar of this invention may be colored and constructed so as to simulate the appearance of earth, pine straw or grass or any other ground cover as may be desired.

Material which is suitable and economical for use in forming the ground collar may be of any desired type. Felt material impregnated with polyurethane resin is well suited for the invention. Such material is water resistant and hence is durable over a substantial period of time and the cost thereof is not excessive.

I claim:

1. A ground collar for enveloping the trunk of a growing plant comprising a generally flat flexible sheet having a slit therein extending from its outer periphery inward to accommodate placement of the collar about the plant trunk at ground level, a first series of radially disposed fingers formed in said sheet and arranged to envelop the plant trunk, and a second series of radially disposed fingers formed in said sheet and in overlying relation with said first series and covering the spaces between the fingers of said first series.

2. A ground collar for enveloping the trunk of a growing plant and comprising a pair of flexible weather resistant generally coincidental sheets disposed in flat face contacting relation to each other, a main slit formed in each of said sheets and extending from the outer edges thereof inwardly to accommodate placement of the collar about a plant trunk, said main slits being disposed out of coincidence with each other, and a plurality of internal slits formed in each of said sheets and defining therebetween a plurality of yieldable fingers for disposition about the trunk of a plant, the fingers in one sheet being disposed in generally overlying relation with respect to the internal slits in the other sheet.

3. A device according to claim 2 wherein at least one of said sheets is formed of felt impregnated with polyurethane resin.

4. A device according to claim 2 wherein the outer peripheries of the two sheets are substantially circular and wherein the upper sheet is of smaller diameter than the lower sheet and wherein a grommetlike third sheet having an internal diameter substantially equal to the outer diameter of the upper one of said two sheets is disposed in coincidental relationship to said two sheets so as to overlie the outer portion of the larger one of said two sheets, said third sheet having a radial slit and a covering flap therefor.

5. A protective device for upright elements comprising a first flexible sheet having an aperture formed therein in spaced relation to the edges thereof, said aperture being somewhat smaller than the element, a main slit formed in said first sheet and extending from the outer edge thereof to said aperture, a plurality of inner slits formed in said first sheet and extending radially outward from said aperture and defining therebetween a plurality of yieldable fingers for enveloping the element, a second flexible sheet having an aperture formed therein, said second sheet being disposed in flat face contacting relation to said first sheet and with said apertures arranged in general coincidence with each other, a main slit formed in said second sheet and extending from the aperture therein to the outer edge thereof, and a plurality of inner slits formed in said second sheet and extending outwardly from the aperture therein to define a plurality of yieldable fingers therebetween, the fingers of one of said sheets being disposed in staggered relation relative to the fingers of the other sheet so as substantially to cover the spaces between the fingers of the other sheet.

6. A device according to claim 5 wherein said main slits are disposed in staggered relation to each other.

7. A device according to claim 5 wherein said fingers are secured in snugly enveloping relationship to said upright element by a friction element disposed thereabout.